Oct. 25, 1955  H. M. CROW  2,721,749
PACKING ASSEMBLY
Filed Aug. 29, 1952

HOWARD M. CROW
INVENTOR
HUEBNER, BEEHLER,
WORREL & HERZIG
ATTORNEYS

United States Patent Office 2,721,749
Patented Oct. 25, 1955

2,721,749
PACKING ASSEMBLY
Howard M. Crow, Lindsay, Calif.

Application August 29, 1952, Serial No. 307,117

2 Claims. (Cl. 286—37)

The present invention relates to a packing assembly adapted to provide a fluid tight seal between a member and a rod rotated or otherwise moved in the member.

In fluid valves, pumps and similar structures the provision of fluid tight seals between relative moving parts is required. For example, such seals are necessary about valve control rods, pump rods, and rotated shafts in centrifugal pumps and the like. The requisite sealing effects are generally accomplished by means of stuffing boxes mounted about the rotated or reciprocated shafts. The boxes contain deformable packing which may be compressed against the respective shafts. Although the provision of absolutely effective sealing action is desirable, the compression of packing materials against movable shafts imposes a frictional drag on the shafts which is frequently of such objectionable nature that design considerations are resolved by compromise between effective sealing and extent of frictional drag that can be tolerated.

An object of the present invention is to provide an improved packing assembly.

Another object is to provide a packing assembly having improved sealing characteristics and reduced frictional losses when engaged with a member movable relative thereto.

Another object is to provide an improved packing assembly which is simple and economical to construct and which includes elements which are conveniently and easily assembled, disassembled, and adjusted.

Another object is to provide an improved packing seal conducive to the minimizing of leakage therethrough and reduction in frictional losses in engagement with a member movable therein as compared with conventional structures for the purpose.

Another object is to provide a packing seal adapted to utilize fluid pressure differentials to attain improved sealing effects.

Further objects and advantages are to provide improved elements and arrangements thereof in a packing assembly of the character described that are economical to produce, durable, and convenient to repair.

Still further objects and advantages will become apparent in the subsequent description in the specification.

Figure 1:
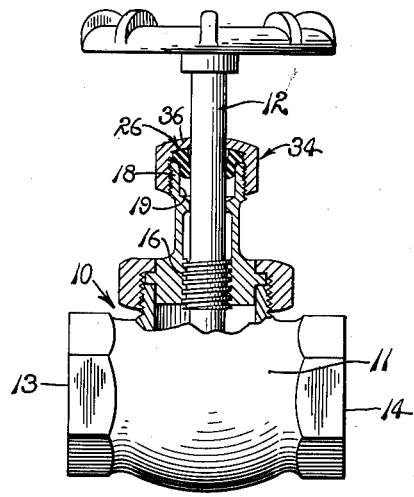
Fig. 1 is a side elevation of a fluid valve having a portion thereof broken away to disclose a packing assembly of the present invention utilized therein.

Referring in greater detail to the drawing:

In Fig. 1, a valve 10 is illustrative of apparatus generally providing a housing 11 relative to which a rod 12 is movable by rotation or endward reciprocation relative thereto, or both. The housing provides a fluid inlet 13 and an outlet 14 between which a closing structure, not shown, is provided for selectively interrupting or regulating fluid flow from the inlet to the outlet. For purposes of the present invention, it is sufficient to observe that the rod or valve stem 12 is rotatably mounted in the housing, as at 16, whereby rotation of the stem axially positions the stem between predetermined positions opening and closing the valve.

The housing provides a bonnet 18 upwardly extended in circumscribing relation to the valve stem 12 and having a cylindrical portion 19 in concentric circumscribing relation to the valve stem. The bonnet provides an externally screw-threaded portion 20. The structure described to this point is essentially conventional and constitutes an operational environment for the present invention. It is significant to note, that the housing 11 including the interior of the bonnet 18 is subjected to a fluid pressure incident to the passage of fluid in the inlet 13 which the present invention utilizes in the provision of an effective seal about the valve stem.

For purposes of the present invention, the bonnet 18 is provided with an extended end having a substantially radially flat annular seat 24 concentric to the valve stem and disposed axially outwardly thereof. The annular seat is inwardly curved to provide a transitional surface between the seat and the cylindrical portion 19.

Figure 2:
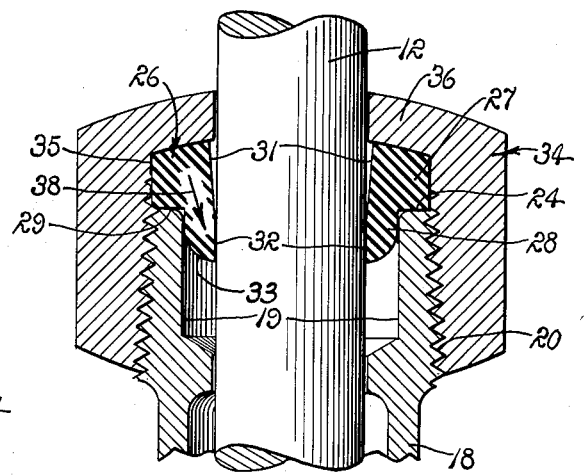
Fig. 2 is a diametric section taken through the packing seal shown in Fig. 1.
Figure 3:
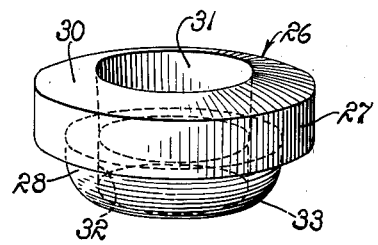
Fig. 3 is a somewhat enlarged perspective view of a packing seal utilized in the packing assembly shown in Fig. 1.
Figure 4:
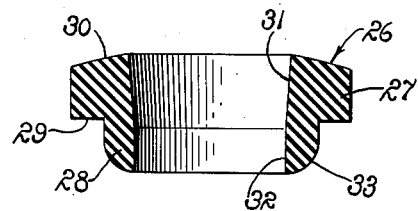
Fig. 4 is an axial section through the packing seal of the present invention.

An annular packing body or seal 26 of resilient material, such as rubber, rubber composition, resilient plastic or other suitable material, whose significant form is best shown in Figs. 2 and 3, is mounted in circumscribing relation on the valve stem. The seal provides a substantially cylindrical flange portion 27 having an integral substantially cylindrical portion 28 of a diameter less than the flange portion axially extended therefrom. The flange portion has a radially flat annular surface 29 disposed toward the extended portion adapted to rest on the annular seat 24 of the valve 10 and an oppositely disposed annular surface 30 outwardly arcuately sloped toward said flat annular surface. The flange portion 27 has an inwardly constricted frusto-conical bore 31 concentrically therein extended through the flange portion and into the extended portion 28 and the extended portion is provided with a cylindrical bore 32 of a diameter equal to the minimum diameter of the frusto-conical bore extended therethrough in alignment with the frusto-conical bore. The extended end 33 of the cylindrical portion 28 of the seal is outwardly curved from the bore 32 toward the flange portion 27 in a radius of curvature approximately the thickness of the cylindrical portion about its bore.

The packing seal 26 is slidably fitted about the valve stem 12, or other rod about which a seal is to be provided, with the annular surface 29 rested on the seat 24 and the cylindrical portion 28 extended in fitted engagement between the stem and the cylindrical portion 19 of the bonnet 18. A packing nut 34 is screw-threadably mounted on the bonnet at 20 and provides a cylindrical surface 35 fitted to the periphery of the flange portion 27 of the packing seal and a collar 36 in compressive engagement with the surface 30 of the flange portion 27. The packing nut 34 is tightened downwardly on the bonnet 18 and the cylindrical extended end portion 28 of the seal forced between the stem 12 and the bonnet 18. It will be noted, that even when the packing seal is compressed, the walls of the frusto-conical bore 31 are in spaced relation to the stem while the cylindrical walls of the bore 32 are engaged with the stem in sealing relation thereto.

Operation

The operation of the packing assembly of the present invention is believed to be clearly apparent and is briefly summarized at this point. Tightening of the packing nut 34 thrusts the cylindrical extended portion 28 of the seal downwardly between the stem 12 and the bonnet 18, as noted. Although compression of the flange portion 27 may tend somewhat to constrict the frusto-conical bore 31 and force the resilient material of the packing seal inwardly toward the stem, the frusto-conical character of the bore precludes actual engagement of the flange portion 27 with the stem 12 in the manner in which conventional packing seals function. As clearly evident in Fig. 1, sealing engagement between the seal 26 and the stem occurs in the cylindrical bore 32 which is axially spaced from the flange portion 27 and thus is not as forcibly constricted by compression of the flange portion as conventional packing seals so that excessive frictional engagement with the valve stem is precluded.

Fluid pressure within the bonnet 18 is imposed against the inner end 33 of the seal and urges the seal against the stem with a force dependent upon the fluid pressure. Engagement of the walls of the cylindrical bore 32 with the stem 12 effectively precludes leaking thereabout and yet is not subject to the excessive frictional losses incident to compressional distortion of conventional packing seals inwardly against such a valve stem.

Although it has been emphasized that the sealing effect attained by the packing assembly of the present invention is not principally due to compressional distortion of the packing seal 26 by tightening the nut 34 on the bonnet 18, the subject invention nevertheless can compensate for wear incident to movement of the valve stem 15 and can attain a measure of increased sealing effect by tightening the nut on the bonnet. Although compression of the flange portion 27 does not appreciably constrict the walls of the frusto-conical bore 31 against the valve stem, it does urge the flange portion downwardly and thus urges the cylindrical extended portion 28 likewise downwardly. Such downward movement causes the annular surface 29 to conform to the inwardly rolled portion of the seat 24 so that a line of thrust represented by the arrow 38 is produced. The line of thrust is obliquely related to the stem and thus has a vector component normal thereto which increases the pressure of engagement of the extended portion 28 with the stem. Inasmuch as the walls of the cylindrical bore 32 are downwardly offset from the flange portion 27 on the packing seal 26, such inward pressure can not be made excessive simply by tightening the nut 34 and simple engagement with the stem is effected which is increased to effective sealing relation by pressure within the bonnet.

Second form of packing seal

Figure 5:
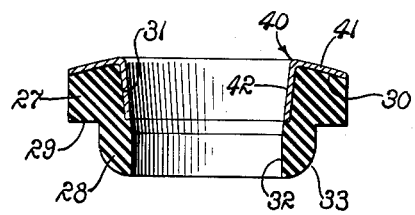
Fig. 5 is a section similar to Fig. 4 illustrating a second form of the packing seal of the present invention.

In certain installations, particularly where high pressures are to be resisted, the packing seal 26 is modified and reinforced as shown in Fig. 5. The packing seal is of the form previously described and like portions thereof given the same identifying numerals previously assigned thereto. In the second form, a ferrule 40 of metal or other substantially rigid material is provided having an annular portion 41 fitted against and bonded to the annular surface 30 of the seal. Integral with the annular portion 41, the ferrule provides a frusto-conical portion 42 which is fitted into the frusto-conical bore 31 and bonded to the walls thereof. The bonding may be achieved by vulcanizing the seal to the ferrule, gluing, cementing, or otherwise securing the ferrule and seal in the described association. The frusto-conical portion 42 terminates short of the cylindrical bore 32 and thus avoids engagement with the valve stem 12, or other rod about which a seal is being formed.

The second form of the packing seal shown in Fig. 5 operates in the manner previously described with the additional advantage that the annular portion 41 thereof provides a suitable bearing surface for the packing nut 34 so as to avoid damage incident to rotational tightening of the nut and the frusto-conical portion 42 positively resists compressional distortion of the flange portion 27 inwardly against the stem. Said frusto-conical portion constitutes an additional assurance that excessive frictional engagement with the valve stem is avoided and that all of the sealing engagement of the seal 26 with the valve stem occurs in the cylindrical bore 32 and results from the moderate thrust represented by the arrow 38 incident to tightening of the packing nut and by fluid pressure within the bonnet imposed on the lower end 33 of the seal.

The packing assembly of the present invention is economical to produce, convenient and easy to assemble and disassemble, provides effective sealing association with a rotated or endwardly reciprocated rod, avoids excessive frictional drag on such a rod, is of increased durability because of the minimized frictional engagement, and being responsive to pressure within the valve, achieves a sealing effect which is proportional to the fluid pressures to be resisted in precluding leakage.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. A packing assembly for rotatable rods comprising a housing having a bonnet rotatably mounting such a rod concentrically therein with an inner end of the rod within the housing subjected to a fluid pressure and an outer end externally of the housing free of said fluid pressure, said housing having an annular seat axially disposed concentrically of the rod in a plane substantially normal to the rod and having an inwardly rounded edge; a packing ring of resilient material having a substantially cylindrical flange, and an integral substantially cylindrical portion of reduced diameter concentrically extended axially of the flange inwardly between the housing and the rod, the flange having a radially flat annular surface rested on the seat of the housing and an oppositely disposed annular end surface outwardly arcuately sloped from the rod toward said flat annular surface, the extended cylindrical portion of the packing ring being substantially normal to the annular surface of the flange rested on the seat and at their juncture being inwardly spaced from the rounded edge of the seat, the flange having an inwardly constricted frusto-conical bore therethrough with an outer end in circumscribing spaced relation to the rod and an inner end inwardly from the flange within the extended portion of the seal fitted to the rod, the extended cylindrical portion having a cylindrical bore therethrough concentrically of the frusto-conical bore and fitted to the rod and an inner end having an endwardly disposed surface outwardly curved from the bore toward the flange of a radius of curvature substantially equal to the thickness of the extended cylindrical portion; and a packing nut screw-threadedly mounted on the housing having a circular wall fitted to the periphery of the flange of the ring and a collar fitted against the outwardly arcuately sloped annular end surface of the ring in circumscribing relation to the rod.

2. A packing assembly for rotatable rods comprising a housing having a bonnet rotatably mounting such a rod concentrically therein with an inner end of the rod within the housing subjected to a fluid pressure and an outer end externally of the housing free of said fluid pressure, said housing having a flat annular seat axially disposed concentrically of the rod in a plane normal to the rod and having an inwardly rounded edge; a packing body of resilient material having a substantially cylindrical flange, and an integral substantially cylindrical portion of a diameter less than the flange concentrically extended axially of the flange between the housing and the rod, the flange having a radially flat annular surface rested on the seat of the housing and an oppositely disposed annular end surface outwardly arcuately sloped from the rod toward said flat annular surface, the flange having an inwardly constricted frusto-conical bore therethrough with an outer end in circumscribing spaced relation to the rod and an inner end inwardly of the bonnet from the flange fitted to the rod, the extended cylindrical portion having a cylindrical bore therethrough concentrically of the frusto-conical bore fitted to the rod providing an inwardly disposed end surface outwardly curved from the bore toward the flange; a ferrule of substantially rigid material having an annular flange portion of substantially the same diameter as the flange bonded to the arcuately sloped annular end surface of the packing body and an integral frusto-conical portion bonded to the body in the frusto-conical portion of the bore terminating short of the extended cylindrical portion of the bore; and a packing nut screw-threadedly mounted on the housing having a cylindrical wall fitted to the flange of the packing body and a collar fitted against the flange portion of the ferrule in circumscribing relation to the rod.

References Cited in the file of this patent

UNITED STATES PATENTS

| | | |
|---|---|---|
| 625,155 | Dresser | May 16, 1899 |
| 683,252 | Crawford | Sept. 24, 1901 |
| 1,915,716 | Bradshaw | June 27, 1933 |
| 1,989,897 | Anderson et al. | Feb. 5, 1935 |
| 2,519,436 | Cadman | Aug. 22, 1950 |
| 2,630,357 | Smith | Mar. 3, 1953 |

FOREIGN PATENTS

| | | |
|---|---|---|
| 501,267 | Belgium | Feb. 28, 1951 |
| 688,252 | Germany | Feb. 16, 1940 |